(12) United States Patent
Christensen et al.

(10) Patent No.: US 9,890,041 B2
(45) Date of Patent: Feb. 13, 2018

(54) PROCESS FOR THE PRODUCTION OF SYNTHESIS GAS

(71) Applicant: Haldor Topsøe A/S, Kgs. Lyngby (DK)

(72) Inventors: Thomas Sandahl Christensen, Lyngby (DK); Pia Elholm, Horsholm (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 15/039,242

(22) PCT Filed: Dec. 11, 2014

(86) PCT No.: PCT/EP2014/077394
§ 371 (c)(1),
(2) Date: May 25, 2016

(87) PCT Pub. No.: WO2015/086752
PCT Pub. Date: Jun. 18, 2015

(65) Prior Publication Data
US 2017/0022056 A1    Jan. 26, 2017

(30) Foreign Application Priority Data
Dec. 12, 2013  (DK) ................................ 2013 70764

(51) Int. Cl.
*C01B 3/40*         (2006.01)
*C10G 2/00*         (2006.01)
(Continued)

(52) U.S. Cl.
CPC .................. *C01B 3/40* (2013.01); *C01B 3/38* (2013.01); *C10G 2/30* (2013.01); *C10L 3/103* (2013.01); *C01B 2203/0233* (2013.01); *C01B 2203/0244* (2013.01); *C01B 2203/0261* (2013.01); *C01B 2203/04* (2013.01); *C01B 2203/0495* (2013.01); *C01B 2203/062* (2013.01); *C01B 2203/1058* (2013.01); *C01B 2203/127* (2013.01); *C01B 2203/1241* (2013.01); *C01B 2203/1247* (2013.01); *C01B 2203/1258* (2013.01);
(Continued)

(58) Field of Classification Search
CPC ..... C01B 3/38; C01B 3/40; C01B 2203/0244; C01B 2203/0261; C01B 2203/04; C01B 2203/0495; C01B 2203/062; C01B 2203/1058; C01B 2203/1247; C01B 2203/1264; C01B 2203/1258; C01B 2203/1241; C01B 2203/142; C01B 2203/0233; C10G 2/30; C10L 3/103; C10L 2290/541
See application file for complete search history.

(56) References Cited

U.S. PATENT DOCUMENTS 3,278,452 A    10/1966  Vorum
2009/0105356 A1*  4/2009  Bormann ................ C01B 3/382
                                                        518/702

FOREIGN PATENT DOCUMENTS

DE    10 2006 023 248 A1    11/2007
DE    10 2008 039 014 A1    2/2010
(Continued)

*Primary Examiner* — Jafar Parsa
(74) *Attorney, Agent, or Firm* — Blank Rome LLP

(57) ABSTRACT

Process for the production of synthesis gas from hydrocarbon feed containing higher hydrocarbons comprising bypassing a portion of the hydrocarbon feed around a first pre-reforming stage and passing the pre-reformed and bypassed portions through at least a second pre-reforming stage.

15 Claims, 1 Drawing Sheet

(51) Int. Cl.
  *C10L 3/10* (2006.01)
  *C01B 3/38* (2006.01)
(52) U.S. Cl.
  CPC    *C01B 2203/1264* (2013.01); *C01B 2203/141* (2013.01); *C01B 2203/142* (2013.01); *C01B 2203/143* (2013.01); *C01B 2203/148* (2013.01); *C01B 2203/169* (2013.01); *C10L 2290/541* (2013.01)

(56) References Cited

FOREIGN PATENT DOCUMENTS

| | | |
|---|---|---|
| EP | 0155867 A1 | 9/1985 |
| EP | 0 233 076 A2 | 8/1987 |
| EP | 1 245 532 A2 | 10/2002 |
| EP | 1 927 577 A1 | 6/2008 |
| WO | WO 2006/095127 A1 | 9/2006 |
| WO | WO 2006/097440 A1 * | 9/2006 |
| WO | WO 2008/154678 | 12/2008 |
| WO | WO 2010/120962 | 10/2010 |

\* cited by examiner

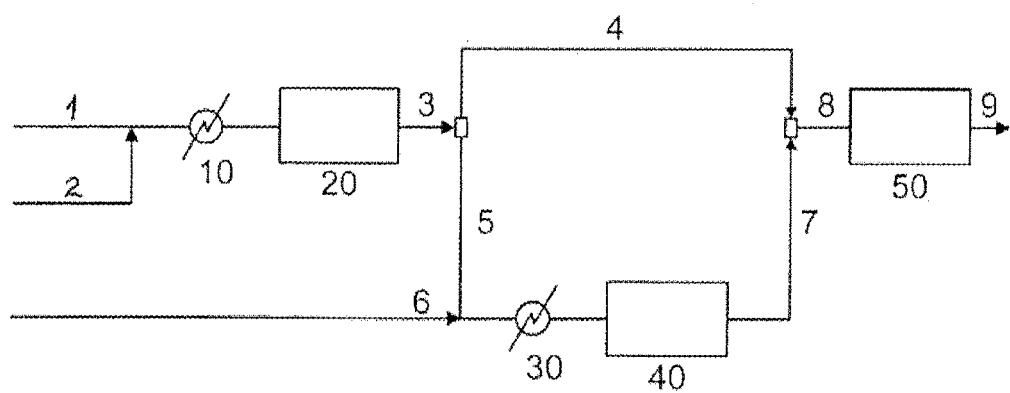

PROCESS FOR THE PRODUCTION OF SYNTHESIS GAS

The present invention relates to a process for the production of a synthesis gas for use in the preparation of hydrocarbons such as diesel and gasoline, as well as for the preparation of synthetic natural gas, and oxygenated hydrocarbons such as methanol by the known processes to prepare these compounds from synthesis gas.

The invention concerns in particular the conversion of a hydrocarbon feedstock with a high content of higher hydrocarbons, like heavy natural gas, associated gas or shale gas, to the synthesis gas.

Synthesis gas, also known as syngas is a gas mainly containing hydrogen and carbon monoxide which is used for downstream production of chemicals such as diesel or gasoline, as well as oxygenated hydrocarbons such as methanol.

Associated gas also known as flare gas, is a form of natural gas with a high content of higher hydrocarbons i.e. C2+ fraction (C2-C6+, or hydrocarbons heavier than methane), and which is commonly found associated with oil exploration and oil production.

In the past most of the associated gas was flared as it was costing more to treat it and transport it to market places than its potential trading value.

Flaring million tons per day of associated gas has and is still contributing to a major source of carbon dioxide emission.

In particular, associated petroleum gas (APG) is a gas dissolved in oil also known to have a high content of higher hydrocarbons. The disposal of APG had typically been solved by flaring.

Shale gas is known to have a high content of higher hydrocarbons as well, which makes it problematic to use this gas in chemical processes.

Conventional processes for reforming comprise production of synthesis gas by steam reforming (SMR), 2-step reforming (SMR plus oxidative catalytic reforming), oxidative reforming such as autothermal reforming (ATR) and catalytic partial oxidation (CPO), or Partial Oxidation (POx or gasifier), optionally any of the above in combination with heat exchange reforming. Each of these reforming technologies defines critical steam content in the feed required to avoid carbon formation or other undesirable phenomena in the reforming process. Optimum performance is obtained by operating marginally above the critical steam content.

In the production of synthesis gas, in particular CO-rich syngas, it is advantageous to operate at low steam-to-carbon ratios. As it is well known in the art, by steam-to-carbon ratio (S/C) is meant the molar ratio of steam (or water) to carbon atoms in any carbon containing hydrocarbons excluding CO and $CO_2$, in a given process stream. Such process lay-outs are possible with the combination of adiabatic pre-reforming and autothermal (ATR) reforming. The S/C ratio could typically be 0.4-0.6 in the pre-reformer and overall 0.6 after addition of steam separately to the ATR.

During the design of the pre-reformer, in particular an adiabatic pre-reformer, the operating conditions must be selected within a narrow temperature window to avoid carbon formation on the pre-reforming catalyst: from higher hydrocarbons forming whisker carbon at the high temperature end of the adiabatic pre-reformer, and from so-called gum formation resulting in polymerization of adsorbed higher hydrocarbons on the catalyst surface at the lower temperature end.

For normal natural gas feedstock with typically 90-95% methane and 5-10% higher hydrocarbons it has been practised and known for many years to select a combination of S/C ratio, temperature, $H_2$ addition and pressure for a simple one-step pre-reforming process lay-out together with highly active pre-reforming catalysts.

For heavy natural gas feedstock which appears as associated gas as well as in connection with shale gas exploration close to the gas field before further processing to pipeline specification, the content of higher hydrocarbons can be much higher than 5-10% vol. In some locations of the world the C2+ fraction (C2-C6+, i.e. hydrocarbons heavier than methane) can be both above 20% vol. and even above 30% vol. For such cases the window of operation at low S/C ratio can be very small and it can even be "closed", meaning that it is not practically possible to select operating conditions characterized by a desired low S/C ratio of say <1.2 or more specifically <1.0 without either forming whisker carbon from higher hydrocarbons or by gum formation in the pre-reformer catalyst.

In a gas to liquid (GTL) plant such as synthetic diesel or syncrude plant based on Fischer Tropsch (FT) synthesis the feed to this synthesis section is a synthesis gas with the main components being hydrogen and carbon monoxide. For FT synthesis, the synthesis gas is normally required to have a $H_2$/CO molar ratio of approximately 2.0. Apart from the main components the synthesis gas contains $N_2$, $CO_2$, Ar and $CH_4$. Autothermal reforming technology (ATR) is one of the preferred technologies for production of synthesis gas for FT synthesis. The preferred operating conditions entail operating the ATR reformer at a very low ratio between the process steam and the hydrocarbon feed stream. This ratio as stated above is the steam-to-carbon ratio (S/C ratio) and it is desirable that it is in the range of 0.2 to 1.0, often in the range of 0.4 to 0.8. This technology is well-known for light natural gas which contains a small amount of higher hydrocarbons, typically below 5% vol. with the major portion 90-95% vol. being methane.

The synthesis gas plant consists normally of the following main process steps: hydrogenation and desulphurization, adiabatic pre-reforming, autothermal reforming, synthesis gas cooling, steam production by waste heat recovery, process condensate stripping.

For heavy natural gas with a high amount of higher hydrocarbons, typically above 5% vol. and especially above 15% vol. it can be a difficult, if not impossible, to operate at the low steam-to-carbon ratios of 0.4-0.8 in the pre-reforming stage. With such heavy natural gas unwanted carbon formation as described above may occur on the pre-reforming catalyst which will disintegrate the catalyst pellets. The steam-to-carbon ratio in the pre-reforming stage can then be increased to ratios above 0.8 and possible further to above 1.1 to eliminate the carbon formation on the pre-reforming catalyst, yet this is undesired since it implies a need for larger steam reforming reactors and overall larger process equipment.

It is well known in the art that adiabatic pre-reforming is conducted as a single stage pre-reforming system in which a hydrocarbon feedstock stream (natural gas or naphtha) is mixed with process steam and heated before the mixture is send to this adiabatic pre-reformer reactor. The unwanted side reactions forming carbon on the catalyst are also known in the art and so is the use of allowed windows of operation in terms of temperature and steam-to-carbon ratios dependent on the type of hydrocarbon feedstock. Accordingly, it is known that each of the common hydrocarbon feedstocks naphtha, LPG and natural gas has different critical operating temperatures and steam-to-carbon ratio. Hence, pre-reforming of light natural gas is conducted at low S/C ratios in the range 0.1-0.5 with the acceptable temperature to avoid carbon formation from methane decreasing with reduced S/C ratios. Pre-reforming of naphtha is known to require much more steam than natural gas with S/C ratios in the range 1.3-2.0 and even higher to 2.5-3.0.

Processes for the treatment of naphtha feed are also known in the art. In particular it is known in a feed split configuration to combine a so-called catalytic rich gas reactor (CRG reactor, apparently a reactor having a fixed bed of catalyst operating adiabatically) CRG reactor) with a hydrogasification reactor. The purpose of the process or system is to produce synthetic natural gas (SNG) and especially methane with concentrations above 90% vol. The feedstock is a light distillate fraction (naphtha) typically covering from C5 to C8, yet not containing methane and light hydrocarbons such as ethane. The S/C ratio of the process on weight basis is particularly high (2.0 wt. or higher) corresponding to above 1.3 S/C ratio—on molar basis, with the inlet temperature to the CRG reactor being 400° C. and to the hydrogasification reactor being 330° C. Thus, operation without carbon formation is controlled by operating the catalytic reactor at very low temperatures, i.e. well below 400° C. and even below 350° C.

WO2010/120962 discloses a system consisting of two adiabatic pre-reformers in series followed by a tubular reformer. The hydrocarbon feed is a natural gas feed with hydrocarbons in the range C1 to C6. The steam to carbon ratio is high—in the range 1.5-2.4. The described process lay-out is focussed on increasing thermal efficiency of a hydrogen plant with a tubular reformer (steam methane reformer, SMR) and a shift reactor. The thermal efficiency enhancer is a heating step in between the first and the second pre-reformer and the second pre-reformer can be a non-adiabatic pre-reformer by using a heating coil in the second pre-reformer. All hydrocarbon enters the first pre-reformer with heating between first and second pre-reformer while steam is split between the first and second pre-reformer.

WO 2008/154678 discloses a system consisting of a multiple stage of parallel pre-reforming and reforming catalysts in a so-called printed circuit reactor. The pre-reforming stages might be arranged in series while all hydrocarbon and all steam enters the first pre-reformer.

U.S. Pat. No. 3,278,452 discloses a process for production of synthesis gas by passing natural gas feed through a steam methane reformer (primary reforming furnace or conventional fuel-fired furnace). A portion of the natural gas by-passes the primary reforming furnace, and is then combined with the primary reformed gas and passed through a secondary reforming vessel. This citation is completely silent about pre-reforming.

It is an object of the present invention to eliminate the carbon formation on pre-reforming catalysts when operating with a wide range of hydrocarbon feedstocks including heavy natural gas, while at the same time keeping the overall steam-to-carbon ratio low, particularly at 0.8 or lower.

It is another object of the present invention to provide a process which eliminates the carbon formation on pre-reforming catalysts when operating with a wide range of hydrocarbon feedstocks including heavy natural gas, and for which the same overall low steam-to-carbon ratio is obtained had a single stage pre-reforming been conducted.

These and other objects are solved by the present invention as recited by the features below in correspondence with the appended claims:

1. Process for the production of a synthesis gas for use in the production of chemical compounds from a hydrocarbon feedstock containing higher hydrocarbons comprising the steps of:
    (a) splitting the hydrocarbon feedstock into at least two streams, the first stream in the form of a major hydrocarbon feedstock stream and the second stream in the form of a by-pass hydrocarbon feedstock stream;
    (b) adding steam to the major hydrocarbon feedstock stream and pre-reforming this stream to a pre-reformed gas containing methane, hydrogen, carbon monoxide, carbon dioxide and higher hydrocarbons;
    (c) combining the bypassed hydrocarbon feedstock stream of step (a) with the pre-reformed gas of step (b) and pre-reforming the thus combined gas to a pre-reformed gas containing methane, hydrogen, carbon monoxide and carbon dioxide;
    (d) reforming in a reforming stage the pre-reformed gas of step (c) into a synthesis gas containing hydrogen, carbon monoxide and carbon dioxide.

2. Process according to feature 1 further comprising the step of a hydrodesulfurization stage removing sulphur compounds in the hydrocarbon feedstock prior to splitting in step (a).

3. Process according to feature 1 further comprising prior to the pre-reforming stage of step (b) or (c) the step of: a hydrodesulfurization stage removing sulphur compounds in the major hydrocarbon feed stock stream, or the by-pass hydrocarbon feedstock stream, or both.

4. Process according to any of features 1-3 in which the pre-reforming stage of step (b) is operated at a steam-to-carbon ratio in the range 0.60-1.30 calculated as steam-to-carbon ratio, while the pre-reforming stage of step (c) is operated at a lower steam-to-carbon ratio and which is in the range 0.30-0.80 calculated as steam-to-carbon ratio.

5. Process according to feature 4 in which the pre-reforming stage of step (b) in addition is operated at steam-to-carbon ratio in the range 1.30-2.80 calculated as steam-to-higher hydrocarbon carbon ratio, while the pre-reforming stage of step (c) in addition is operated at a higher steam-to-hydrocarbon carbon ratio and which is in the range 2.80-4.50 calculated as steam-to-higher hydrocarbon carbon ratio.

6. Process according to any of features 1-5 in which the major hydrocarbon feedstock stream formed after the split is at least 30% vol. of the hydrocarbon feedstock.

7. Process according to any of features 1-6 in which the steam addition of step (b) is high pressure steam from a process condensate stripper located downstream the reforming stage (d).

8. Process of any of features 1-7 in which the steam is solely added to the major hydrocarbon feedstock stream passed to the pre-reforming stage of step (b).

9. Process according to any of features 1-8 in which the mixture resulting from adding steam to the major hydrocarbon feedstock stream is preheated to a feed temperature of 380-480° C. before entering the pre-reforming stage of step (b).

10. Process according to any of features 1-9 in which the pre-reforming stage of either step (b) or (c) or both is adiabatic pre-reforming under the presence of catalyst.

11. Process according to feature 10 in which the catalyst is a solid nickel containing steam reforming catalyst suitable for operation at temperatures below 650° C.

12. Process according to any of features 1-11 in which the reforming stage of step (d) consists of SMR (steam methane reforming), HER (heat exchange reforming), ATR (autothermal reforming), CPO (catalytic partial oxidation), POx (partial oxidation), or a combination thereof.

13. Process according to feature 12 in which the reforming stage is ATR or CPO or POx.

14. Process according to any of feature 1-13 in which the synthesis gas of step (d) is subjected to synthesis of liquid hydrocarbons, including the Fischer-Tropsch synthesis and synthesis of gasoline.

15. Process of feature 14, in which tail gas or off-gas from the synthesis of the liquid hydrocarbons is recycled to the pre-reforming stage (b), pre-reforming stage (c), reforming stage (d), or a combination thereof.

16. Process according to anyone of features 1 to 15, wherein the hydrocarbon feedstock containing higher hydrocarbons is selected from associated gas or shale gas or associated petroleum gas.

The sole FIGURE discloses a particular embodiment of the invention comprising the treatment of a hydrocarbon feedstock in two pre-reforming stages.

To prevent carbon formation at low S/C ratios with hydrocarbon feedstock streams containing a high content of higher hydrocarbons, i.e. which are in the range C2 to C6+(hydrocarbons higher than methane) such as heavy natural gas we have invented a process in which we split the hydrocarbon feedstock stream into two or more portions. The first portion of the hydrocarbon feedstock stream is mixed with the full amount of steam needed in the process and is lead to the first pre-reformer, in particular an adiabatic pre-reformer. The temperature of the feed mixture is adjusted to the optimal value, specifically to 350-500° C., more specifically 380-480° C., to avoid carbon formation in this first-step pre-reformer. This pre-reformer is then characterized by operation at a medium S/C-ratio below 1.2 or 1.3 and preferably in the range 0.60-1.30, more preferably in the range 0.90-1.20, most preferably at 1.10. The effluent from the first pre-reformer is then mixed with the second portion of the hydrocarbon feedstock stream (by-passed portion) and then directed to a second-step pre-reforming. The temperature of the feed mixture to the second step is adjusted to the optimal value to avoid carbon formation in the second-step pre-reformer, specifically to 350-500° C., more specifically 380-480° C. This second step pre-reformer is characterized by operating at a lower S/C ratio of 0.30-0.80, preferably 0.40-0.75, more preferably 0.5-0.75, most preferably at 0.70; yet at medium ratio of steam to higher hydrocarbon ratio (S/HHC).

As used herein the term "steam to higher hydrocarbon ratio (S/HHC)" means the molar ratio of steam (or water) to higher hydrocarbons in a given process stream and where the higher hydrocarbons represent the C2+ fraction (C2-C6+) of the process gas.

As used herein the term "overall steam to carbon ratio, overall S/C" means the molar ratio of steam (or water) added to the process to carbon atoms in any carbon containing hydrocarbons, excluding CO and $CO_2$ contained in the hydrocarbon feedstock (before split).

As used herein the term "overall steam to higher carbon ratio, overall S/HHC" means the molar ratio of steam (or water) added to the process to carbon atoms in any carbon containing hydrocarbons with 2 or more carbon atoms (C2-C6+) contained in the hydrocarbon feedstock (before split).

The term "pre-reforming" and "pre-reformer" as used herein before and in the following shall mean a steam reforming process and steam reformer by which higher hydrocarbons are converted to a mixture of methane, carbon oxides and hydrogen.

As is well known for a person skilled in the art, the term "pre-reforming" shall not be exchanged with steam reforming or other reforming processes, such as steam methane reforming (SMR), autothermal and/or secondary reforming. Pre-reforming is normally conducted at temperatures in the range 375-650° C., preferably adiabatically in a fixed bed of catalyst, and its main purpose is to remove hydrocarbons higher than methane, whereas steam reforming is a subsequent stage conducted at much higher temperatures (700-1000° C.) and with the main purpose of producing a mixture of CO, $CO_2$ and $H_2$ (synthesis gas) suitable for downstream applications such as Fischer-Tropsch synthesis.

Hence, the pre-reforming according to any of the above or below embodiments is preferably conducted adiabatically.

Without the inventive process as disclosed herein, the overall S/C would have to be above 1 to secure carbon free operation, with attendant increase in plant equipment size and thus capital costs due to higher amount of steam to be transported throughout the process.

In a particular embodiment, a third pre-reformer downstream the second pre-reformer can be introduced for special heavy feed gas. A special awareness in the second pre-reformer (and also to the next pre-reformer(s) in series) needs to be paid to potential carbon formation from methane which could be formed at high temperature and low overall S/C ratios, which may appear in the exit of the second (or following pre-reformer(s)) in case the overall heat of reaction is exothermic in the second pre-reformer.

The present invention thus comprises two (or more) adiabatic pre-reformers in series with step-wise addition of the hydrocarbon containing feed (i.e heavy natural gas) to avoid carbon formation on the pre-reforming while at the same time maintaining a low overall S/C ratio. Each of the pre-reformers operates at a medium S/HHC ratio and carbon-free operation is obtained; in particular the first pre-reforming stage (step (b)) is operated at 1.30-2.80, more specifically 1.50-2.00 or 1.60-1.80 calculated as steam-to-higher hydrocarbon carbon ratio, while the second pre-reforming stage (step (c)) in addition is operated at a higher steam-to-hydrocarbon carbon ratio and which is in the range 2.80-4.50, more specifically 3.00-4.50 or 3.50-3.60 calculated as steam-to-higher hydrocarbon carbon ratio.

In a particular embodiment the major hydrocarbon feedstock stream formed after the split is at least 50% vol. of the hydrocarbon feedstock, preferably in the range 50-90% vol, preferably 60-80% vol, more preferably 70% vol. A particularly suitable range is 30-70% vol.

The embodiment (feature) in which the steam addition of step (b) is high pressure steam from a process condensate stripper located downstream the reforming stage (d), enables the removal of undesired dissolved gases as well as the reuse of process condensate formed in the process downstream, thereby increasing the energy efficiency of the process.

The particular embodiment in which steam is solely added to the major hydrocarbon feedstock stream passed to the pre-reforming stage of step (b) (no separate addition of steam in the pre-reforming stage of step (c)), enables not only to obtain a high S/C ratio in the first pre-reforming stage, but also involves simplicity and lower capital expenses as there is need for fewer pumps and piping in the process.

In the second pre-reforming stage the content of higher hydrocarbons will be reformed into hydrogen, carbon monoxide, carbon dioxide and methane corresponding to the reaction schemes (1), (2) and (3) below.

$$C_nH_m+nH_2O \rightarrow nCO+(n+m/2)H_2-\text{heat} \quad (1)$$

$$CH_4+H_2O \leftrightarrow CO+3H_2-\text{heat} \quad (2)$$

$$CO+H_2O \leftrightarrow CO_2+H_2+\text{heat} \quad (3)$$

Reaction (1) describes the conversion of higher hydrocarbons into CO and $H_2$. Reaction (2) shows the reforming equilibrium reaction of methane to CO and $H_2$. Reaction (3) is the shift reaction.

Reactions (1) and (2) are endothermic while reaction (3) is exothermic, but the heat required for reactions (1) and (2) will dominate the picture. When the pre-reformer is an adiabatic reactor, there is no heat input and thus a decrease in temperature is observed when operating with natural gas as feedstock.

In the operation of the reformer system, carbon formation on the catalyst particles is possible in case of operation without steam, at too low steam-to-carbon ratio or too high temperatures. Carbon deposits inside the particles will reduce the mechanical strength and increase the pressure drop over the catalyst bed, while deposits on the outer surface of the particles will reduce the activity.

Carbon deposition in the pre-reformer is possible in case of low steam to carbon ratios or in case of overheating of the feed. A certain high temperature is necessary to obtain measurable catalytic activity and conversion of the hydrocarbon feed and thus to run the pre-reforming process, yet too high a temperature may also result in carbon deposition, which of course is undesirable. Accordingly, the mixture resulting from adding steam to the major hydrocarbon feedstock stream is preheated to a feed temperature of 380-480° C. before entering the pre-reforming stage of step (b). The same temperature range may be applied to the second and optionally subsequent pre-reforming stages.

In the accompanying FIG. 1 a hydrocarbon feedstock in the form of natural gas 1 is combined with hydrogen stream 2 and then heated in fired heater 10 prior to entering the hydrodesulfurization (HDS) unit 20. The desulfurized hydrocarbon feedstock 3 is then split into a bypass stream 4 and a major hydrocarbon feedstock stream 5. The latter is mixed with steam 6 and heated in heat exchanger 30 to suitable temperature for conducting the pre-reforming stage in first pre-reforming unit 40. The thus pre-reformed gas 7 is mixed with the bypass stream 4 to form a combined stream 8 which is then passed to the second pre-reforming stage in pre-reforming unit 50. The thus finally pre-reformed gas 9 is then lead to a reforming stage downstream (not shown) for production of synthesis gas.

EXAMPLE

According to an embodiment of the invention a split feed arrangement and two pre-reformers in series for the major hydrocarbon feedstock stream is applied. In this way the overall steam-to-carbon ratio is maintained low, but the first pre-reformer is operated at high steam-to-carbon ratio and the second pre-reformer is operated at lower steam-to-carbon ratio yet at a high ratio of steam to carbon in higher hydrocarbons.

In the example the feed gas has the following composition:

|  | Normal | Heavy 1 | Heavy 2 |
|---|---|---|---|
| N2 | 3.5 | 1.68 | 0.85 |
| CO | | | |
| CO2 | 0.5 | 0.02 | 6.11 |
| CH4 | 90 | 75.47 | 58.93 |
| C2H6 | 3 | 13.62 | 15.55 |
| C3H8 | 1.5 | 6.29 | 10.51 |
| iC4 | 0.2 | 0.72 | 1.53 |
| nC4 | 0.3 | 1.43 | 2.97 |
| iC5 | | 0.27 | 0.86 |
| nC5 | | 0.26 | 0.79 |
| C6+ | | 0.16 | 1.9 |
| SUM | 100 | 100 | 100 |

The heavy natural gas feed stock is characterized by more than 40% vol. of the carbon contained in the higher hydrocarbons and for the Gas 2 it is more than 60% vol, whereas the normal natural gas (this example) contain only 6-7% vol of the carbon as higher hydrocarbons. Specifically, for Heavy 1 (Heavy feed gas 1) the carbon in HHC is 62 while total carbon is 138, giving 45% vol. For Heavy 2 (Heavy feed gas 2) the carbon in HHC is 106 while total carbon is 165, thus giving 64% vol.

The heavy natural gas feed is first mixed with hydrogen and sent to the desulphurization section, any organic sulphur compounds in the natural gas are hydrogenated to form $H_2S$, then the $H_2S$ (original content or formed by hydrogenation) is removed from the natural gas feed by absorption on a ZnO absorption mass.

The pre-reforming takes place in the first (step (b)) and second pre-reformer (step (c)) units. This solution is adopted in order to improve the process steam consumption and minimize steam consumption, thereby increasing energy efficiency. All higher hydrocarbons present in the feed are converted into pre-reformed gas consisting mainly of $CH_4$, $H_2$, CO and $CO_2$.

Both pre-reformers contain a pre-reforming catalyst in the form of a nickel containing reforming catalyst suitable for operation at temperatures below 650° C. and for operation at low steam-to-carbon ratios.

Before entering the pre-reforming section, the desulphurized feed is split; 70% of the feed is mixed with superheated HP steam and saturated steam from the process condensate stripper, hereby obtaining the desired steam/carbon ratio. The gas mixture is then preheated to a feed temperature in the range 380-480° C. in a heat exchanger before entering the first pre-reformer. The pre-reformed gas is then mixed with the remaining desulphurized gas before going into the second pre-reformer. The thus finally pre-reformed gas is then sent further on to the ATR reformer and the remaining part of the GTL plant.

For the particular example of Heavy feedgas 2 (Heavy 2) the steam-to carbon in the prereformers are:
1st Preformer,
Steam/C (as HC)=1.10, Steam/C (as HHC)=1.74
$2^{nd}$ Preformer
Steam/C (as HC)=0.70, Steam/C (as HHC)=3.51
Overall
Steam/C (as HC)=0.78, Steam/C (as HHC)=1.24
This two-step reforming lay-out is carbon free on the catalyst.

If the process had been conducted as a single stage pre-reforming with the overall S/C (as HC ratio) then the process lay-out would have resulted in formation of carbon on the pre-reforming catalysts from higher hydrocarbons.

Without the inventive process, the overall S/C would have to be above 1 to be able to secure carbon free operation.

The invention claimed is:

1. A process for the production of a synthesis gas for use in the production of chemical compounds from a hydrocarbon feedstock containing higher hydrocarbons comprising the steps of:
   (a) splitting the hydrocarbon feedstock into at least two streams, a first hydrocarbon feedstock stream and a second hydrocarbon feedstock stream in the form of a by-pass hydrocarbon feedstock stream;
   (b) adding steam to the first hydrocarbon feedstock stream and pre-reforming this stream to a pre-reformed gas containing methane, hydrogen, carbon monoxide, carbon dioxide and higher hydrocarbons;
   (c) combining the bypassed hydrocarbon feedstock stream of step (a) with the pre-reformed gas of step (b) and pre-reforming the thus combined gas to a pre-reformed gas containing methane, hydrogen, carbon monoxide and carbon dioxide, wherein a steam-to-carbon ratio of the pre-reforming in step (b) is higher than a steam-to-carbon ratio of the pre-reforming in step (c);
   (d) reforming in a reforming stage the pre-reformed gas of step (c) into a synthesis gas containing hydrogen, carbon monoxide and carbon dioxide.

2. The process according to claim 1 further comprising the step of a hydrodesulfurization stage removing sulphur compounds in the hydrocarbon feedstock prior to splitting in step (a).

3. The process according to claim 1 further comprising prior to the pre-reforming stage of step (b) or (c) the step of: a hydrodesulfurization stage removing sulphur compounds in the first hydrocarbon feed stock stream, or the second hydrocarbon feedstock stream, or both.

4. The process according to claim 1 in which the pre-reforming stage of step (b) is operated at a steam-to-carbon ratio in the range 0.60-1.30 calculated as steam-to-carbon ratio, while the pre-reforming stage of step (c) is operated at a lower steam-to-carbon ratio and which is in the range 0.30-0.80 calculated as steam-to-carbon ratio.

5. The process according to claim 1 in which the first hydrocarbon feedstock stream formed after the split is at least 30% vol of the hydrocarbon feedstock.

6. The process according to claim 1 in which the steam addition of step (b) is high pressure steam from a process condensate stripper located downstream the reforming stage (d).

7. The process of claim 1 in which the steam is solely added to the first hydrocarbon feedstock stream passed to the pre-reforming stage of step (b).

8. The process according to claim 1 in which the mixture resulting from adding steam to the first hydrocarbon feedstock stream is preheated to a feed temperature of 380-480° C. before entering the pre-reforming stage of step (b).

9. The process according to claim 1 in which the pre-reforming stage of either step (b) or (c) or both is adiabatic pre-reforming under the presence of catalyst.

10. The process according to claim 9 in which the catalyst is a solid nickel containing steam reforming catalyst suitable for operation at temperatures below 650° C.

11. The process according to claim 1 in which the reforming stage of step (d) consists of SMR, HER, ATR, CPO, POx, or a combination thereof.

12. The process according to claim 11 in which the reforming stage is ATR or CPO or POx.

13. The process according to claim 1 in which the synthesis gas of step (d) is subjected to synthesis of liquid hydrocarbons, including the Fischer-Tropsch synthesis and synthesis of gasoline.

14. The process of claim 13, in which tail gas or off-gas from the synthesis of the liquid hydrocarbons is recycled to the pre-reforming stage (b), pre-reforming stage (c), reforming stage (d), or a combination thereof.

15. The process according to claim 1, wherein the hydrocarbon feedstock containing higher hydrocarbons is selected from associated gas or shale gas or associated petroleum gas.

* * * * *